(12) United States Patent
Kost et al.

(10) Patent No.: US 8,866,452 B1
(45) Date of Patent: Oct. 21, 2014

(54) VARIABLE MINIMUM INPUT VOLTAGE BASED SWITCHING IN AN ELECTRONIC POWER CONTROL SYSTEM

(75) Inventors: Michael A. Kost, Cedar Park, TX (US); Celite Milbrandt, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 347 days.

(21) Appl. No.: 13/206,836

(22) Filed: Aug. 10, 2011

Related U.S. Application Data

(60) Provisional application No. 61/372,527, filed on Aug. 11, 2010.

(51) Int. Cl.
*H02M 3/156* (2006.01)

(52) U.S. Cl.
USPC .......................................... 323/246; 323/300

(58) Field of Classification Search
USPC ......... 323/237, 239, 241–244, 246, 299, 300, 323/320, 322–326
See application file for complete search history.

(56) References Cited

U.S. PATENT DOCUMENTS

| | | |
|---|---|---|
| 3,790,878 A | 2/1974 | Brokaw |
| 4,677,366 A | 6/1987 | Wilkinson et al. |
| 4,683,529 A | 7/1987 | Bucher |
| 4,737,658 A | 4/1988 | Kronmuller et al. |
| 4,937,728 A | 6/1990 | Leonardi |
| 4,940,929 A | 7/1990 | Williams |
| 4,977,366 A | 12/1990 | Powell |
| 5,001,620 A | 3/1991 | Smith |
| 5,003,454 A | 3/1991 | Bruning |
| 5,055,746 A | 10/1991 | Hu et al. |
| 5,109,185 A | 4/1992 | Ball |
| 5,264,780 A | 11/1993 | Bruer et al. |
| 5,278,490 A | 1/1994 | Smedley |
| 5,327,071 A * | 7/1994 | Frederick et al. .............. 323/299 |
| 5,383,109 A | 1/1995 | Maksimovic et al. |

(Continued)

FOREIGN PATENT DOCUMENTS

| | | |
|---|---|---|
| EP | 0536535 A1 | 4/1993 |
| EP | 0636889 A1 | 1/1995 |

(Continued)

OTHER PUBLICATIONS

Seidel, et al, A Practical Comparison Among High-Power-Factor Electronic Ballasts with Similar Ideas, IEEE Transactions on Industry Applications, vol. 41, No. 6, Nov./Dec. 2005, pp. 1574-1583, Santa Maria, Brazil.

(Continued)

*Primary Examiner* — Harry Behm
(74) *Attorney, Agent, or Firm* — Terrile, Cannatti, Chambers & Holland, LLP; Kent B. Chambers

(57) ABSTRACT

An electronic system includes a controller that controls switching in a switching power converter in accordance with a dynamically determined, minimum line voltage switching threshold based on one or more operating parameters of the electronic system. In at least one embodiment, the one or more operating parameters of the electronic system include power utilization of a load. The controller utilizes the dynamically determined, minimum line voltage switching threshold to determine when to enable and disable switching in the switching power converter. Since the controller bases determination of the dynamically determined, minimum line voltage switching threshold on power utilization of the load, the controller operates more efficiently by reducing switching losses while still meeting power demand by the load.

2 Claims, 8 Drawing Sheets

(56) References Cited

U.S. PATENT DOCUMENTS

| | | |
|---|---|---|
| 5,424,932 A | 6/1995 | Inou et al. |
| 5,430,635 A | 7/1995 | Liu |
| 5,479,333 A | 12/1995 | McCambridge et al. |
| 5,481,178 A | 1/1996 | Wilcox et al. |
| 5,565,761 A | 10/1996 | Hwang |
| 5,638,265 A | 6/1997 | Gabor |
| 5,691,890 A | 11/1997 | Hyde |
| 5,747,977 A | 5/1998 | Hwang |
| 5,757,635 A | 5/1998 | Seong |
| 5,764,039 A | 6/1998 | Choi et al. |
| 5,783,909 A | 7/1998 | Hochstein |
| 5,798,635 A | 8/1998 | Hwang et al. |
| 5,874,725 A | 2/1999 | Yamaguchi |
| 5,960,207 A | 9/1999 | Brown |
| 5,994,885 A | 11/1999 | Wilcox et al. |
| 6,043,633 A | 3/2000 | Lev et al. |
| 6,084,450 A | 7/2000 | Smith et al. |
| 6,091,233 A | 7/2000 | Hwang et al. |
| 6,160,724 A | 12/2000 | Hemena et al. |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus et al. |
| 6,343,026 B1 | 1/2002 | Perry |
| 6,356,040 B1 | 3/2002 | Preis et al. |
| 6,445,600 B2 | 9/2002 | Ben-Yaakov |
| 6,469,484 B2 | 10/2002 | L'Hermite et al. |
| 6,531,854 B2 | 3/2003 | Hwang |
| 6,580,258 B2 | 6/2003 | Wilcox et al. |
| 6,583,550 B2 | 6/2003 | Iwasa |
| 6,628,106 B1 | 9/2003 | Batarseh et al. |
| 6,657,417 B1 | 12/2003 | Hwang |
| 6,768,655 B1 | 7/2004 | Yang et al. |
| 6,781,351 B2 | 8/2004 | Mednik et al. |
| 6,839,247 B1 | 1/2005 | Yang |
| 6,882,552 B2 | 4/2005 | Telefus et al. |
| 6,933,706 B2 | 8/2005 | Shih |
| 6,940,733 B2 | 9/2005 | Schie et al. |
| 6,944,034 B1 | 9/2005 | Shteynberg et al. |
| 6,956,750 B1 | 10/2005 | Eason et al. |
| 6,975,523 B2 | 12/2005 | Kim et al. |
| 6,980,446 B2 | 12/2005 | Simada et al. |
| 7,072,191 B2 | 7/2006 | Nakao et al. |
| 7,161,816 B2 | 1/2007 | Shteynberg et al. |
| 7,221,130 B2 | 5/2007 | Ribeiro et al. |
| 7,266,001 B1 | 9/2007 | Notohamiprodjo et al. |
| 7,292,013 B1 | 11/2007 | Chen et al. |
| 7,295,452 B1 * | 11/2007 | Liu .................................. 363/82 |
| 7,411,379 B2 | 8/2008 | Chu |
| 7,554,473 B2 | 6/2009 | Melanson |
| 7,606,532 B2 | 10/2009 | Wuidart |
| 7,667,986 B2 | 2/2010 | Artusi et al. |
| 7,684,223 B2 | 3/2010 | Wei |
| 7,719,246 B2 | 5/2010 | Melanson |
| 7,719,248 B1 | 5/2010 | Melanson |
| 7,746,043 B2 | 6/2010 | Melanson |
| 7,804,480 B2 | 9/2010 | Jeon et al. |
| 7,872,883 B1 | 1/2011 | Elbanhawy |
| 7,894,216 B2 | 2/2011 | Melanson |
| 8,008,898 B2 | 8/2011 | Melanson et al. |
| 8,169,806 B2 * | 5/2012 | Sims et al. ....................... 363/97 |
| 8,222,772 B1 * | 7/2012 | Vinciarelli .................... 307/140 |
| 2003/0090252 A1 | 5/2003 | Hazucha |
| 2003/0111969 A1 | 6/2003 | Konishi et al. |
| 2003/0160576 A1 | 8/2003 | Suzuki |
| 2003/0174520 A1 | 9/2003 | Bimbaud |
| 2003/0214821 A1 | 11/2003 | Giannopoulos et al. |
| 2003/0223255 A1 | 12/2003 | Ben-Yaakov |
| 2004/0046683 A1 | 3/2004 | Mitamura et al. |
| 2005/0057237 A1 | 3/2005 | Clavel |
| 2005/0207190 A1 | 9/2005 | Gritter |
| 2005/0270813 A1 | 12/2005 | Zhang et al. |
| 2005/0275354 A1 | 12/2005 | Hausman |
| 2006/0013026 A1 | 1/2006 | Frank et al. |
| 2006/0022648 A1 | 2/2006 | Zeltser |
| 2007/0103949 A1 | 5/2007 | Tsuruya |
| 2008/0018261 A1 | 1/2008 | Kastner |
| 2008/0043504 A1 | 2/2008 | Ye |
| 2008/0117656 A1 | 5/2008 | Clarkin |
| 2008/0130336 A1 | 6/2008 | Taguchi |
| 2008/0175029 A1 | 7/2008 | Jung et al. |
| 2008/0259655 A1 | 10/2008 | Wei et al. |
| 2008/0278132 A1 | 11/2008 | Kesterson et al. |
| 2008/0310194 A1 | 12/2008 | Huang et al. |
| 2009/0067204 A1 | 3/2009 | Ye et al. |
| 2010/0238689 A1 | 9/2010 | Fei et al. |
| 2011/0110132 A1 | 5/2011 | Rausch |

FOREIGN PATENT DOCUMENTS

| | | |
|---|---|---|
| EP | 1213823 A2 | 6/2002 |
| EP | 1962263 A2 | 8/2008 |
| EP | 2232949 | 9/2010 |
| JP | 2006022107 A1 | 3/2006 |
| WO | 2004/051834 A1 | 6/2004 |
| WO | 2006013557 | 2/2006 |
| WO | 2006022107 | 3/2006 |
| WO | 2008/004008 A2 | 1/2008 |
| WO | 2008152838 | 12/2008 |

OTHER PUBLICATIONS

Yao, et al, Soft Switching Circuit for Interleaved Boost Converters, IEEE Transactions on Power Electronics, vol. 22, No. 1, Jan. 2007, pp. 80-86, Zhejiang Univ., Hangzhou.

Zhang, et al, A New Duty Cycle Control Strategy for Power Factor Correction and FPGA Implementation, IEEE Transactions on Power Electronics, vol. 21, No. 6, Nov. 2006, pp. 1745-1753, Ontario, Canada.

Zhou, et al, Novel Sampling Algorithm for DSP Controlled 2kW PFC Converter, IEEE Transactions on Power Electronics, vol. 16, No. 2, Mar. 2001, pp. 217-222, Zhejiang Univ., Hangzhou.

Texas Instruments, High Performance Power Factor Preregulator, UC2855A/B and UC3855A/B, SLUS328B, Jun. 1998, Revised Oct. 2005, pp. 1-14, Dallas, TX, USA.

Balogh, Laszlo, et al,Power-Factor Correction with Interleaved Boost Converters in Continuous-Inductr-Current Mode, 1993, IEEE, pp. 168-174, Switzerland.

Cheng, Hung L., et al, A Novel Single-Stage High-Power-Factor Electronic Ballast with Symmetrical Topology, Power Electronics and Motion Control Conference, 2006. IPEMC 2006. CES/IEEE 5th International, Aug. 14-16, 2006, vol. 50, No. 4, Aug. 2003, pp. 759-766, Nat. Ilan Univ., Taiwan.

Fairchild Semiconductor, Theory and Application of the ML4821 Average Current Mode PFC Controllerr, Fairchild Semiconductor Application Note 42030, Rev. 1.0, Oct. 25, 2000, pp. 1-19, San Jose, California, USA.

Garcia, O., et al, High Efficiency PFC Converter to Meet EN610000302 and A14, Industrial Electronics, 2002. ISIE 2002. Proceedings of the 2002 IEEE International Symposium, vol. 3, pp. 975-980, Div. de Ingenieria Electronica, Univ. Politecnica de Madrid, Spain.

Infineon Technologies AG, Standalone Power Factor Correction (PFC) Controller in Continuous Conduction Mode (CCM), Infineon Power Management and Supply, CCM-PFC, ICE2PCS01, ICE2PCSO1G, Version 2.1, Feb. 6, 2007, p. 1-22, Munchen, Germany.

Lu, et al, Bridgeless PFC Implementation Using One Cycle Control Technique, International Rectifier, 2005, pp. 1-6, Blacksburg, VA, USA.

International Rectifer, PFC One Cycle Control PFC IC, International Rectifier, Data Sheet No. PD60230 rev. C, IR1150(S)(PbF), IR11501(S)(PbF), Feb. 5, 2007, pp. 1-16, El Segundo, CA, USA.

International Rectifier, IRAC1150-300W Demo Board, User's Guide, Rev 3.0, International Rectifier Computing and Communications SBU-AC-DC Application Group, pp. 1-18, Aug. 2, 2005, El Segundo, CO USA.

Lai, Z., et al, A Family of Power-Factor-Correction Controllerr, Applied Power Electronics Conference and Exposition, 1997. APEC '97 Conference Proceedings 1997., Twelfth Annual, vol. 1, pp. 66-73, Feb. 23-27, 1997, Irvine, CA.

(56) References Cited

OTHER PUBLICATIONS

Lee, P, et al, Steady-State Analysis of an Interleaved Boost Converter with Coupled Inductors, IEEE Transactions on Industrial Electronics, vol. 47, No. 4, Aug. 2000, pp. 787-795, Hung Horn, Kowloon, Hong Kong.

Supertex, Inc., HV9931 Unity Power Factor LED Lamp Driver, Supertex, Inc., Application Note AN-H52, 2007, pp. 1-20, Sunnyvale, CA, USA.

Ben-Yaakov, et al, The Dynamics of a PWM Boost Converter with Resistive Input, IEEE Transactions on Industrial Electronics, vol. 46., No. 3, Jun. 1999, pp. 1-8, Negev, Beer-Sheva, Israel.

Erickson, Robert W., et al, Fundamentals of Power Electronics, Second Edition, Chapter 6, 2001, pp. 131-184, Boulder CO, USA.

Fairchild Semiconductor, Theory and Application of the ML4821 Average Current Mode PFC Controller, Fairchild Semiconductor, Application Note 42030, Rev. 1.0, Oct. 25, 2000, pp. 1-19, San Jose, CA, USA.

Hirota, et al, Analysis of Single Switch Delta-Sigma Modulated Pulse Space Modulation PFC Converter Effectively Using Switching Power Device, Power Electronics Specialists Conference, 2002. pesc 02. 2002 IEEE 33rd Annual, vol. 2, pp. 682-686, Hyogo Japan.

Madigan, et al, Integrated High-Quality Rectifier-Regulators, Industrial Electronics, IEEE Transactions, vol. 46, Issue 4, pp. 749-758, Aug. 1999, Cary, NC, USA.

Miwa, et al, High Efficiency Power Factor Correction Using Interleaving Techniques, Applied Power Electronics Conference and Exposition, 1992. APEC '92. Conference Proceedings 1992., Seventh Annual, Feb. 23-27, 1992, pp. 557-568, MIT, Cambridge, MA, USA.

Prodic, et al, Dead-Zone Digital Controller for Improved Dynamic Response of Power Factor Preregulators, Applied Power Electronics Conference and Exposition, 2003. APEC '03. Eighteenth Annual IEEE, Feb. 9-13, 2003, vol. 1, pp. 382-388, Boulder, CO, USA.

Prodic, et al, Digital Controller for High-Frequency Rectifiers with Power Factor Correction Suitable for On-Chip Implementation, Power Conversion Conference-Nagoya, 2007. PCC '07, Apr. 2-5, 2007, pp. 1527-1531, Toronto, Canada.

Prodic, Aleksander, Compensator Design and Stability Assessment for Fast Voltage Loops of Power Factor Correction Rectifiers, IEEE Transactions on Power Electronics, vol. 22, Issue 5, Sep. 2007, pp. 1719-1730, Toronto, Canada.

On Semiconductor, Cost Effective Power Factor Controller, NCR1606, Mar. 2007, pp. 1-22, Rev. 3, Denver, Colorado, USA.

On Semiconductor, Power Factor Controller for Compact and Robust Continuous Conduction Mode Pre-Converters, NCP1654, Mar. 2007, pp. 1-16, Denver, Colorado, USA.

Philips Semiconductors, 90W Resonant SMPS with TEA1610 SwingChip, Application Note AN99011, Sep. 14, 1999, pp. 1-28, The Netherlands.

Rensas, Renesas Technology Releases Industry's First Critical-Conduction-Mode Power Factor Correction Control IC Implementing Interleaved Operations, R2A20112, Dec. 18, 2006, pp. 1-4, Tokyo, Japan.

Renesas, PFC Control IC R2A20111 Evaluation Board, Application Note R2A20111 EVB, Feb. 2007, Rev. 1.0, pp. 1-40, Tokyo, Japan.

Renesas, Power Factor Correction Controller IC, HA16174P/FP, Rev. 1.0, Jan. 6, 2006, pp. 1-38, Tokyo, Japan.

Stmicroelectronics, Transition Mode PFC Controller, Datasheet L6562, Rev. 8, Nov. 2005, pp. 1-16, Geneva, Switzerland.

Stmicroelectronics, Electronic Ballast with PFC Using L6574 and L6561, Application Note AN993, May 2004, pp. 1-20, Geneva, Switzerland.

Stmicroelectronics, Advanced Transition-Mode PFC Controller L6563 and L6563A, Mar. 2007, pp. 1-40, Geneva, Switzerland.

Stmicroelectronics, CFL/TL Ballast Driver Preheat and Dimming L6574, Sep. 2003, pp. 1-10, Geneva, Switzerland.

Stmicroelectronics, Power Factor Connector L6561, Rev 16, Jun. 2004, pp. 1-13, Geneva, Switzerland.

Texas Instruments, Avoiding Audible Noise at Light Loads When Using Leading Edge Triggered PFC Converters, Application Report SLUA309A, Mar. 2004-Revised Sep. 2004, pp. 1-4, Dallas, Texas, USA.

Texas Instruments, Startup Current Transient of the Leading Edge Triggered PFC Controllers, Application Report SLUA3231, Jul. 2004, pp. 1-4, Dallas, Texas, USA.

Texas Instruments, Current Sense Transformer Evaluation UCC3817, Application Report SLUA308, Feb. 2004, pp. 1-3, Dallas, Texas, USA.

Texas Instruments, 350-W Two-Phase Interleaved PFC Pre-regulator Design Review, Application Report SLUA369B, Feb. 2005-Revised Mar. 2007, pp. 1-22, Dallas, Texas, USA.

Texas Instruments, Average Current Mode Controlled Power Factor Correction Converter using TMS320LF2407A, Application Report SPRA902A, Jul. 2005, pp. 1-15, Dallas, Texas, USA.

Texas Instruments, Transition Mode PFC Controller, UCC28050, UCC28051, UCC38050, UCC38051, Application Note SLUS5150, Sep. 2002-Revised Jul. 2005, pp. 1-28, Dallas, Texas, USA.

Texas Instruments, Interleaving Continuous Conduction Mode PFC Controller, UCC28070, SLUS794C, Nov. 2007-Revised Jun. 2009, pp. 1-45, Dallas, Texas, USA.

Texas Instruments, BiCMOS Power Factor Preregulator Evaluation Board UCC3817, User's Guide, SLUU077C, Sep. 2000-Revised Nov. 2002, pp. 1-10, Dallas, Texas, USA.

On Semiconductor Four Key Steps to Design a Continuous Conduction Mode PFC Stage Using the NCP1653, Application Note AND8184/D, Nov. 2004, pp. 1-8, Phoenix, AZ, USA.

Unitrode, BiCMOS Power Factor Preregulator, Texas Instruments, UCC2817, UCC2818, UCC3817, UCC3818, SLUS3951, Feb. 2000-Revised Feb. 2006, pp. 1-25, Dallas, Texas, USA.

Unitrode, Optimizing Performance in UC3854 Power Factor Correction Applications, Design Note DDN 39E, 1999, pp. 1-6, Merrimack, Maine, USA.

Unitrode, High Power-Factor Preregulator, UC1852, UC2852, UC3852, Feb. 5, 2007, pp. 1-8, Merrimack, Maine, USA.

Unitrode, UC3854A/B and UC3855A/B Provide Power Limiting with Sinusoidal Input Current for PFC Front Ends, SLUA196A, Design Note DN-66, Jun. 1995-Revised Nov. 2001, pp. 1-6, Merrimack, Maine, USA.

Unitrode, Programmable Output Power Factor Preregulator, UCC2819, UCC3819, SLUS482B, Apr. 2001-Revised Dec. 2004, pp. 1-16, Merrimack, Maine, USA.

Texas Instruments, UCC281019, 8-Pin Continuous Conduction Mode (CCM) PFC Controller, SLU828B, Revised Apr. 2009, pp. 1-48, Dallas, Texas, USA.

http://toolbarpdf.com/docs/functions-and-features-of=inverters. html, Jan. 20, 2011, pp. 1-8.

International Rectifier, Brown, et al, PFC Converter Design with IR1150 One Cycle Control IC, Application Note AN 1077, Rev. 2.3, Jun. 2005, pp. 1-18, El Segundo, California, USA.

Linear Technology, Single Switch PWM Controller with Auxiliary Boost Converter, Linear Technology Corporation, Data Sheet LTT950, 2003, pp. 1-20, Milpitas, California, USA.

Linear Technology Power Factor Controller Linear Technology Corporation, Data Sheet LT1248, 1993, pp. 1-12, Milpitas, California, USA.

Fairchild Semiconductor, 500W Power-Factor-Corrected (PFC) Converter Design with FAN4810, Application Note 6004, Rev. 1.0.1, Oct. 31, 2003, pp. 1-14, San Jose, California, USA.

Fairchild Semiconductor, Power Factor Correction (PFC) Basics, Application Note 42047, Rev. 0.9.0, Aug. 19, 2004, pp. 1-11, San Jose, California, USA.

Fairchild Semiconductor Design of Power Factor Correction Circuit Using FAN7527B, Application Note AN1124, Rev. 1.8.1, May 30, 2002, pp. 1-22, San Jose, California, USA.

On Semiconductor, Enhanced High Voltage and Efficient Standby Mode Power Factor Controller, NCP1605, Feb. 7, 2007, Rev. 1, pp. 1-32, Denver, Colorado, USA.

Fairchild Semiconductor, Low Start-Up Current PFC/PWM Controller Combos FAN4800, Rev. 1.0.6, Nov. 2006, pp. 1-20, San Jose, California, USA.

(56) References Cited

OTHER PUBLICATIONS

Fairchild Semiconductor Power Factor Correction Controller FAN4810, Rev. 1.0.12, Sep. 24, 2003, pp. 1-14, San Jose, California, USA.
Fairchild Semiconductors, ZVS Average Current PFC Controller FAN 4822, Rev. 1.0.1, Aug. 10, 2001, pp. 1-10, San Jose, California, USA.
Fairchild Semiconductor, Ballast Control IC FAN7532, Rev. 1.0.3, Jun. 2006, pp. 1-16, San Jose, California, USA.
Fairchild Semiconductor, Simple Ballast Controller, FAN7544, Rev. 1.0.0, Sep. 21, 2004, pp. 1-14, San Jose, California, USA.
Fairchild Semiconductor, Power Factor Correction Controller, FAN 7527B, Aug. 16, 2003, pp. 1-12, San Jose, California, USA.
Fairchild Semiconductor, Ballast Control IC, FAN 7711, Rev. 1.0.3, 2007, pp. 1-23, San Jose, California, USA.
Fairchild Semiconductor, Simple Ballast Controller, KA7541, Rev. 1.0.3, Sep. 27, 2001, pp. 1-14, San Jose, California, USA.
Fairchild Semiconductor, Power Factor Controller, ML4812, Rev. 1.0.4, May 31, 2001, pp. 1-18, San Jose, California, USA.
Fairchild Semiconductor, Power Factor Controller, ML4821, Rev. 1.0.2, Jun. 19, 2001, pp. 1-11, San Jose, California, USA.
Freescale Semiconductor, Dimmable Light Ballast with Power Factor Correction, Designer Reference Manual, DRM067, Rev. 1, Dec. 2005, pp. 1-72, M68HC08 Microcontrollers, Chandler, Arizona, USA.
Freescale Semiconductor, Design of Indirect Power Factor Correction Using 56F800/E, Freescale Semiconductor Application Note, AN1965, Rev. 1, Jul. 2005, pp. 1-20, Chandler, Arizona, USA.
Freescale Semiconductor, Implementing PFC Average Current Mode Control using the MC9S12E128, Application Note AN3052, Addendum to Reference Design Manual DRM064, Rev. 0, Nov. 2005, pp. 1-8, Chandler, Arizona, USA.
Maksimovic, et al, Impact of Digital Control in Power Electronics, International Symposium on Power Semiconductor Devices and ICS, 2004, pp. 2-22, Boulder, Colorado, USA.
Mammano, Bob, Current Sensing Solutions for Power Supply Designers, Texas Instruments, 2001, pp. 1-36, Dallas, Texas, USA.
Noon, Jim, High Performance Power Factor Preregulator UC3855A/B, Texas Instruments Spplication Report, SLUA146A, Revised Apr. 2004, pp. 1-35, Dallas, Texas, USA.
NXP Semiconductors TEA1750, GreenChip III, SMBS Control IC Product Data Sheet, Rev. 01, Apr. 6, 2007, pp. 1-30, Eindhoven, The Netherlands.
Turchi, Joel, Power Factor Correction Stages Operating in Critical Conduction Mode, ON Semiconductor, Application Note AND8123/D, Sep. 2003—Rev. 1, pp. 1-20, Denver, Colorado, USA.
On Semiconductor, GreenLine Compact Power Factor Controller: Innovative Circuit for Cost Effective Solution, MC33260, Semiconductor Components Industries, Sep. 2005, Rev. 9, pp. 1-22, Denver, Colorado, USA.

\* cited by examiner

VARIABLE MINIMUM INPUT VOLTAGE BASED SWITCHING IN AN ELECTRONIC POWER CONTROL SYSTEM

CROSS-REFERENCE TO RELATED APPLICATION

This application claims the benefit under 35 U.S.C. §119(e) and 37 C.F.R. §1.78 of U.S. Provisional Application No. 61/372,527 filed on Aug. 11, 2010, and entitled "Dynamic Light Load Switching Disable," and is incorporated by reference in its entirety.

BACKGROUND OF THE INVENTION

1. Field of the Invention

The present invention relates in general to the field of electronics, and more specifically to a method and system for variable minimum input voltage based switching in an electronic power control system to, for example, reduce switching related losses.

2. Description of the Related Art

Power control systems often utilize a switching power converter to convert alternating current (AC) voltages to direct current (DC) voltages or DC-to-DC. Switching power converters provide power factor corrected and regulated output voltages to many devices that utilize a regulated output voltage. Exemplary devices that utilize a regulated output voltage include lamps, such as light emitting diode and gas discharge type lamps, cellular telephones, computing devices, personal digital assistants, and power supplies.

FIG. 1 depicts an electronic power control system 100 that includes a controller 102 that controls the operation of, and, thus, the delivery of power by switching power converter 104. Voltage source 106 supplies an alternating current (AC) input voltage $V_{IN}$ to a full bridge diode rectifier 108. The voltage source 106 is, for example, a public utility, and the AC voltage $V_{IN}$ is, for example, a 60 Hz/110 V line voltage in the United States of America or a 50 Hz/220 V line voltage in Europe. The full bridge rectifier 108 supplies a rectified AC voltage $V_X$ to the switching power converter 104. Capacitor 110 filters high frequency components from rectified voltage $V_X$.

To control the operation of switching power converter 104, controller 102 generates the control signal $CS_0$ to control conductivity of field effect transistor (FET) switch 124. The control signal $CS_0$ is a pulse width modulated signal. Control signal $CS_0$ generally has a frequency within a range of 20 kHz to 100 kHz. Each pulse of control signal $CS_0$ turns switch 124 ON (i.e. conducts), and the inductor current $i_L$ energizes inductor 126. Diode 128 prevents current flow from link capacitor 130 into switch 124. When the pulse ends, the inductor 126 reverses voltage polarity (commonly referred to as "flyback") and the inductor current $i_L$ charges link capacitor 130 through diode 111. The switching power converter 104 is a boost-type converter because the link voltage $V_{LINK}$ is greater than the rectified input voltage $V_X$. Controller 102 operates the switching power converter 104 to maintain an approximately constant link voltage $V_{LINK}$ for load 132 and provide power factor correction. Load 132 can be any type of load that utilizes the link voltage, such as lamps, such as light emitting diode and gas discharge type lamps, cellular telephones, computing devices, personal digital assistants, and power supplies.

To control operation of switching power converter 104, controller 102 monitors a sense signal $V_{X\_SENSE}$, which represents the rectified voltage $V_X$, and monitors a sense signal $V_{LINK\_SENSE}$, which represents the link voltage $V_{LINK}$. Controller 102 uses the sense signals $V_{X\_SENSE}$ and $V_{LINK\_SENSE}$ to generate the control signal $CS_0$ using well-known control circuitry.

FIG. 2 depicts exemplary signal waveforms 200, which are associated with electronic power control system 100. The signal waveforms 200 are the rectified input voltage $V_X$ and control signal $CS_{OA}$. Control signal $CS_{OA}$ represents two exemplary cycles 202 and 204 of the control signal $CS_0$ in FIG. 1. Referring to FIGS. 1 and 2, since each cycle 202 and 204 of input voltage $V_X$ is one-half of the original cycle of the input supply voltage $V_{IN}$, each full cycle 202 and 204 of input voltage $V_X$ spans from 0° to 180° of the rectified input voltage $V_X$. In one embodiment, when controlling switching power converter 104, controller 102 continuously generates the control signal $CS_{OA}$ for the full 0°-180° of each cycle, including cycles 202 and 204, of input voltage $V_X$.

FIG. 3 depicts exemplary signal waveforms 300, which are associated with electronic power control system 100. The signal waveforms 300 are the utilized portion $V_{X\_USED}$ of the rectified input voltage $V_X$ and control signal $CS_{OB}$. Control signal $CS_{OB}$ represents two exemplary cycles 302 and 304 of the control signal $CS_0$ in FIG. 1. Referring to FIGS. 1 and 3, when controlling switching power converter 104, controller 102 generates the control signal $CS_{OB}$ only when the input voltage $V_X$ is greater than a static, minimum line voltage $V_{LINE\_MIN\_STATIC}$. In at least one embodiment, generating pulses of control signal $CS_B$ only when the line voltage $V_X$ is greater than the minimum line voltage $V_{LINE\_MIN}$ facilitates a simpler calculation of the duration for each pulse width of control signal $CS_{OB}$. The minimum line voltage $V_{LINE\_MIN\_STATIC}$ is, thus, static and is set to facilitate the simpler calculations. The minimum line voltage $V_{LINE\_MIN\_STATIC}$ corresponds to the first and last 5° of the input voltage $V_X$, i.e. $V_{LINE\_MIN\_STATIC}$ corresponds to 5° and 175° of $V_X$. Thus, controller 102 does not generate the control signal $CS_B$ for the first and last 5° of the input voltage $V_X$.

Referring to FIGS. 2 and 3, generating control signal $CS_{OA}$ continuously allows switching power converter 104 to deliver full power to load 132 and facilitates accurate power factor correction. However, control signal $CS_{OA}$ incurs switching losses throughout the entire cycle of each cycle of input voltage $V_X$. Switching losses are incurred, for example, by charging and discharging parasitic capacitances associated with switch 124. Generating control signal $CS_{OB}$ using the static, minimum line voltage $V_{LINE\_MIN\_STATIC}$ reduces switching losses of switch 124 by eliminating the switching losses that would otherwise be incurred when the controller 102 stops generating control signal $CS_B$, e.g. for the first and last 5° of the input voltage $V_X$. However, the intermittent generation of control signal $CS_{OB}$ causes harmonic distortion when the current $i_L$ is not proportional to the input voltage $V_X$. Because of the abrupt restarts of control signal $CS_{OB}$ during the first and last 5° of each cycle of the input voltage $V_X$, the input voltage $V_X$ is not proportional to the current $i_L$ during the first and last 5° of each cycle of the input voltage $V_X$. Maximum total harmonic distortion of a load on a public voltage distribution systems, such as an embodiment of voltage source 106, is often regulated, such as by the IEC61000-3-2 specification of the International Engineering Consortium. The IEC61000-3-2 specification specifies limits for harmonic current emissions applicable to electrical and electronic equipment having an input current up to and including 16 A per phase and intended to be connected to public low-voltage distribution systems."

SUMMARY OF THE INVENTION

In one embodiment of the present invention, a method includes sensing a link voltage to a switching power converter of an electronic system. The link voltage is a voltage provided to a load coupled to the switching power converter. The method further includes dynamically determining power utilization of a load coupled to the switching power converter using the sensed link voltage. The method also includes causing the switching power converter to cease converting power during a first portion of a cycle of an input voltage to the switching power converter when one or more operating parameters of the electronic system indicates that power from a second portion of the cycle of the input voltage is sufficient to meet a power demand of the load. The method additionally includes causing the switching power converter to convert power during the remaining portion of each cycle of the input voltage.

In another embodiment of the present invention, a method includes determining power utilization of a load coupled to a switching power converter. The method also includes generating a switch control signal to control the switching power converter when an input voltage to the switching power converter is greater than a threshold value. The threshold value is based on power utilization of a load. The method further includes disabling generation of the switch control signal when the input voltage to the switching power converter is less than the threshold value.

In a further embodiment of the present invention, an apparatus includes a controller having an input to sense a link voltage to a switching power converter of an electronic system. The link voltage is a voltage provided to a load coupled to the switching power converter. The controller is configured to at least dynamically determine power utilization of a load coupled to the switching power converter using the sensed link voltage. The controller is also configured to at least cause the switching power converter to cease converting power during a first portion of a cycle of an input voltage to the switching power converter when one or more operating parameters of the electronic system indicates that power from a second portion of the cycle of the input voltage is sufficient to meet a power demand of the load. The controller is further configured to at least cause the switching power converter to convert power during the remaining portion of each cycle of the input voltage.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An electronic system includes a controller that controls switching in a switching power converter in accordance with a dynamically determined, minimum line voltage switching threshold based on one or more operating parameters of the electronic system. In at least one embodiment, the one or more operating parameters of the electronic system include power utilization of a load. The controller utilizes the dynamically determined, minimum line voltage switching threshold to determine when to enable and disable switching in the switching power converter. Since the controller bases determination of the dynamically determined, minimum line voltage switching threshold on power utilization of the load, the controller operates more efficiently by reducing switching losses while still meeting power demand by the load. For example, in at least one embodiment, when the power utilization of the load decreases, the controller increases the dynamically determined, minimum line voltage switching threshold and, thus, disables switching in the switching power converter for a longer amount of time. In at least one embodiment, when the power utilization of the load increases, the controller lowers the dynamically determined, minimum line voltage switching threshold and, thus, disables switching in the switching power converter for a shorter amount of time.

In at least one embodiment, the term "dynamically determine" is used herein to indicate that a value or values is determined based on one or more other values that can change over time and are determined or obtained during operation of the controller. The manner of dynamically determining values is a matter of design choice. For example, in at least one embodiment, the controller calculates the dynamically determined, minimum line voltage switching threshold. In at least one embodiment, the controller determines the determined, minimum line voltage switching threshold by accessing values from a memory that correspond to a particular amount of power utilization by the load.

Disabling and enabling switching of the dynamically determined, minimum line voltage switching threshold introduces harmonic distortion and can introduce instability in a control signal generation system. In at least one embodiment, the controller has a maximum threshold value for the dynamically determined, minimum line voltage switching threshold to prevent, for example, exceeding total harmonic distortion regulations.

Figure 4:
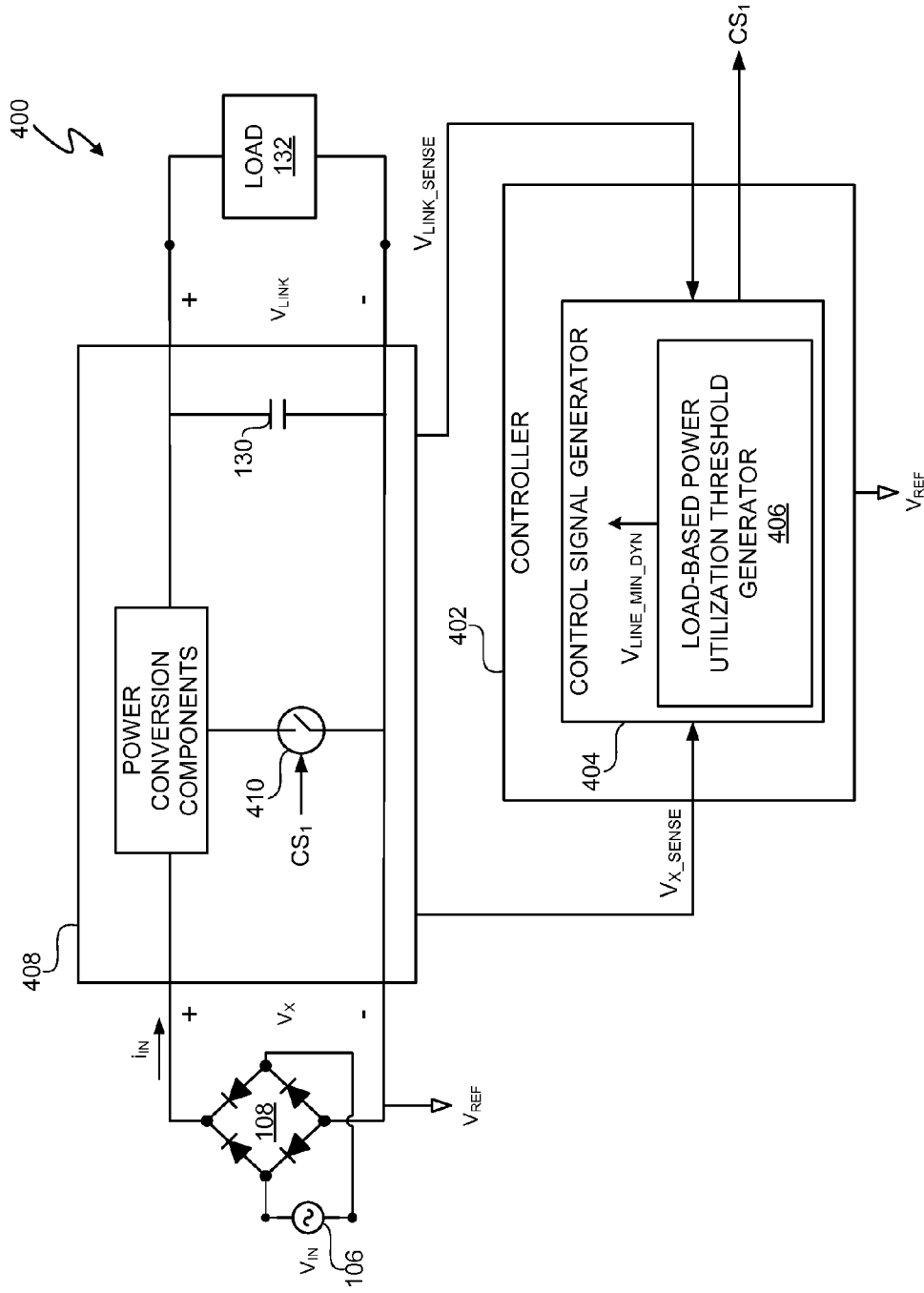
FIG. 4 depicts an electronic power control system that dynamically determines a minimum line voltage switching threshold based on power utilization of a load.

FIG. 4 depicts an electronic power control system 400 that dynamically determines a minimum line voltage switching threshold based on power utilization of load 132. Electronic power system 400 includes a controller 402, which is constructed as, for example, an integrated circuit, discrete digital and/or analog components, or a combination of integrated circuits and discrete digital and/or analog components. The controller 402 includes a control signal generator 404 to generate a control signal $CS_1$. The control signal generator 404 includes a load-based power utilization threshold generator 406 that generates a dynamically determined, minimum line voltage switching threshold $V_{LINE\_MIN\_DYN}$. As subsequently described in more detail, the threshold generator 406 dynamically determines power utilization by the load 132 and generates a corresponding minimum line voltage switching threshold $V_{LINE\_MIN\_DYN}$. By dynamically determining the minimum line voltage switching threshold $V_{LINE\_MIN\_DYN}$ based on power utilization of load 132, controller 402 disables and enables the control signal $CS_1$ in correlation with power supplied by switching power converter 408 to power utilization by the load 132. The frequency of determining the minimum line voltage switching threshold $V_{LINE\_MIN\_DYN}$ is a matter of design choice.

Figure 1:
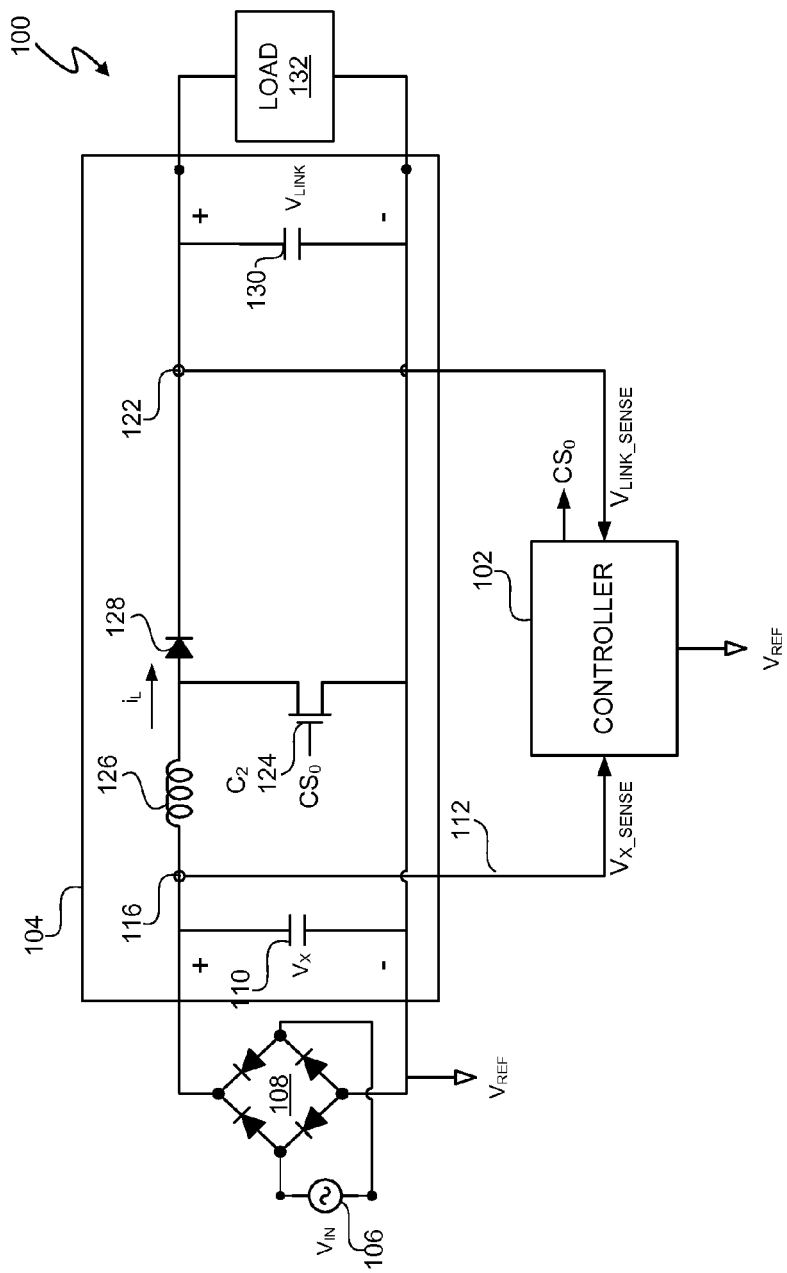
FIG. 1 (labeled prior art) depicts an electronic power control system with continuous monitoring of input and link voltages by a controller.
Figure 2:
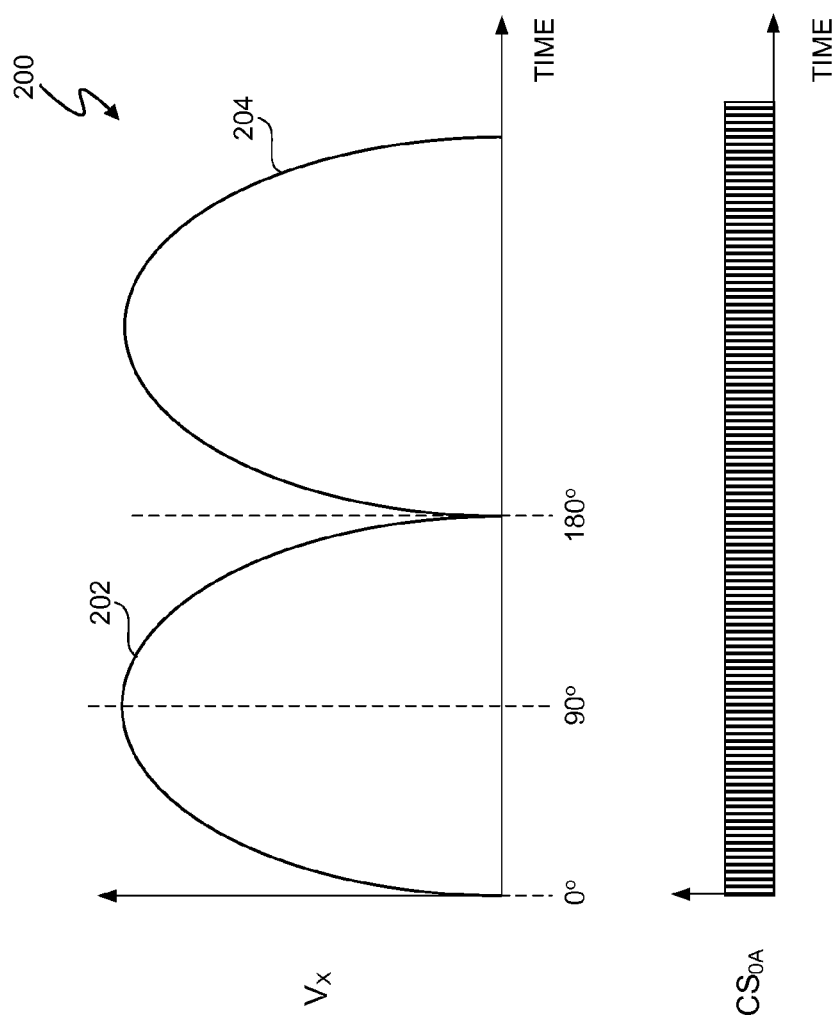
FIG. 2 (labeled prior art) depicts a set of exemplary signal waveforms, which are associated with electronic power control system of FIG. 1.
Figure 3:
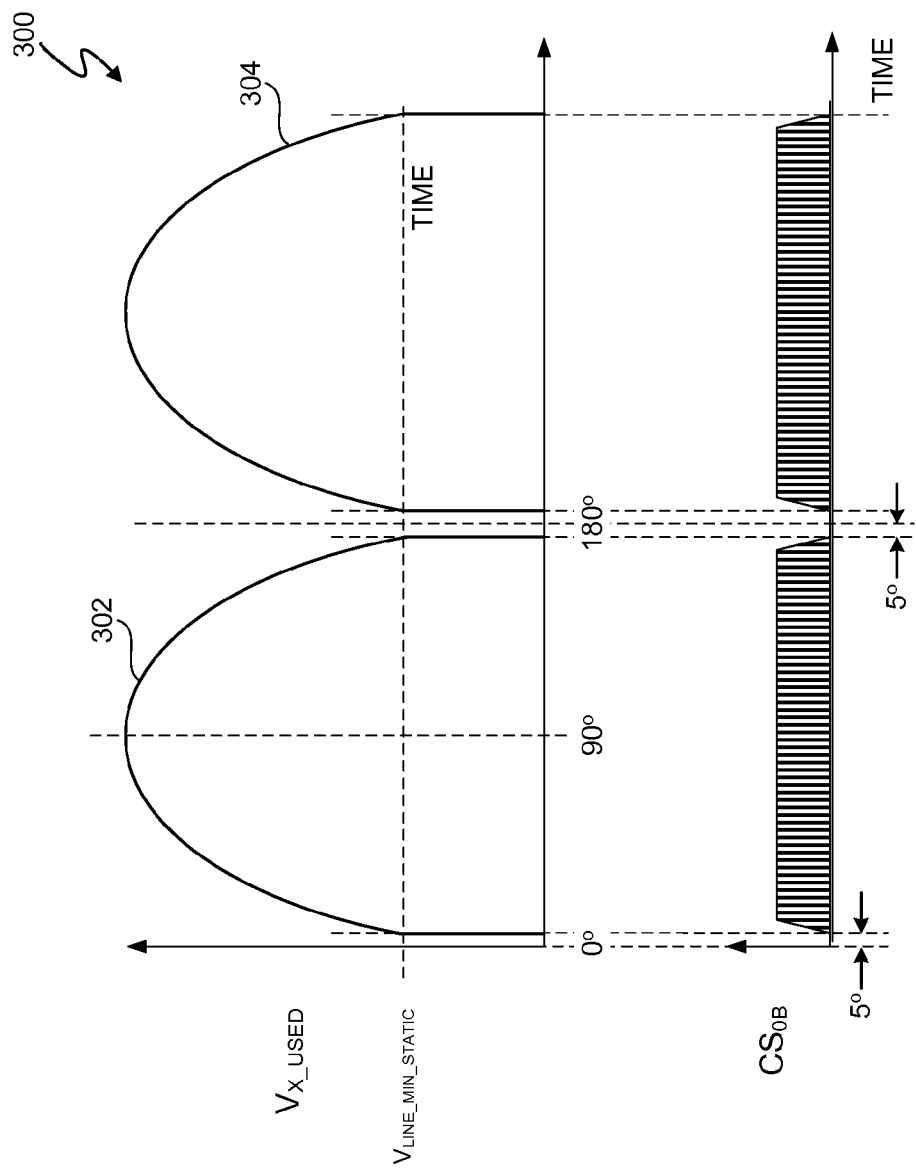
FIG. 3 (labeled prior art) depicts another set of exemplary signal waveforms, which are associated with electronic power control system of FIG. 1.

Switching power converter 408 can be any type of switching power converter such as a boost-type switching power converter identical to switching power converter 104 (FIG. 1), a buck-type switching power converter, a boost-buck type switching power converter, or a Cúk-type switching power converter. Other types of switching power converters are well-known to those of ordinary skill in the art. Switch 410 is any type of switch such as a field effect transistor (FET).

Figure 5:
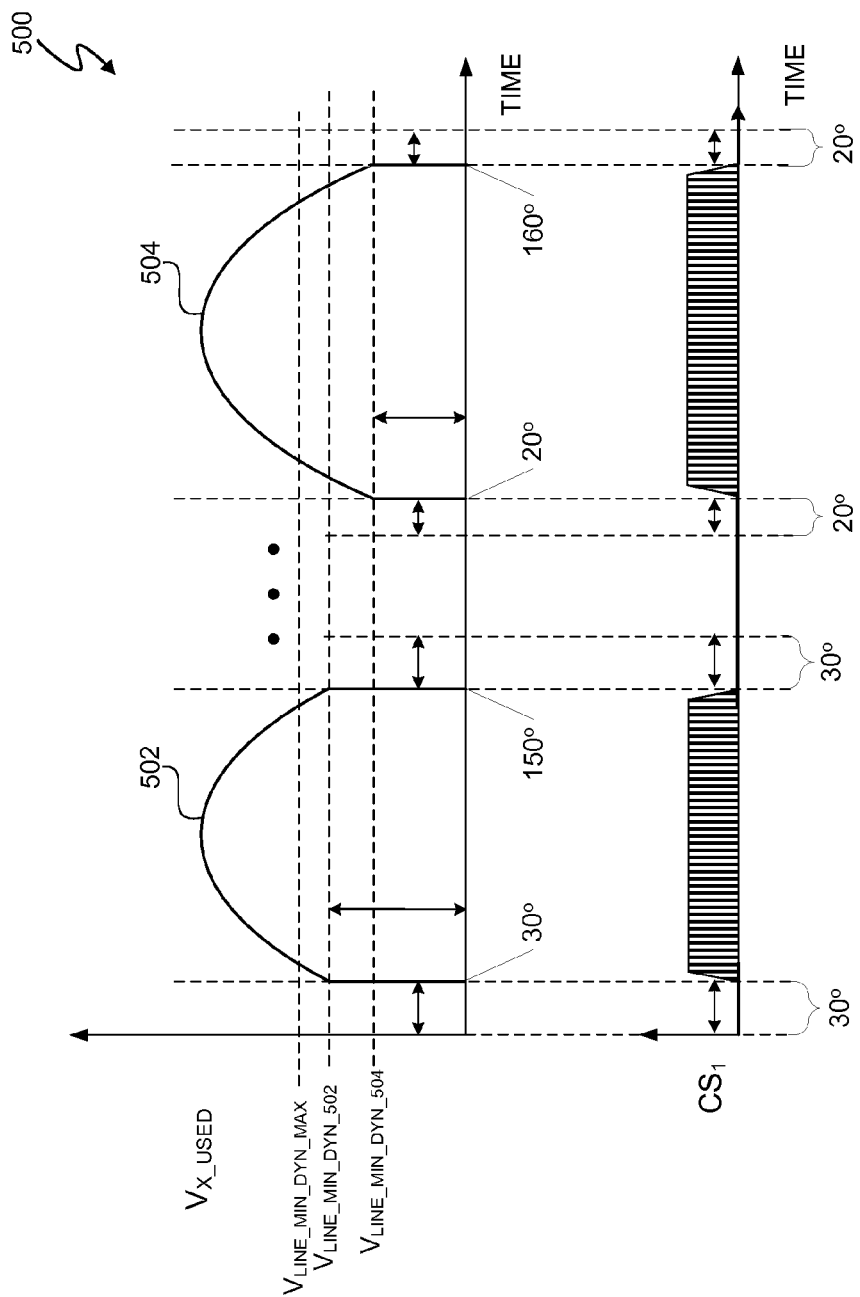
FIG. 5 depicts exemplary signals associated with the electronic power control system of FIG. 4.

FIG. 5 depicts exemplary signals 500 associated with electronic power control system 400. Referring to FIGS. 4 and 5, since the minimum line voltage switching threshold $V_{LINE\_MIN\_DYN}$ is dynamically determined by controller 402, the voltage switching threshold $V_{LINE\_MIN\_DYN}$ changes over time as the power utilization of the load 132 changes. In at least one embodiment, the value of the voltage switching threshold $V_{LINE\_MIN\_DYN}$ correlates to a switching duty cycle of control signal $CS_1$. The "switching duty cycle of control signal $CS_1$" refers to the percentage of time during a cycle of input voltage $V_X$ during which control signal $CS_1$ is generating pulses to cause switch 410 to conduct. In at least one embodiment, controller 402 does not generate a pulse of control signal $CS_1$ until the input voltage $V_X$ is equal to the voltage switching threshold $V_{LINE\_MIN\_DYN}$. Once the input voltage $V_X$ reaches the voltage switching threshold $V_{LINE\_MIN\_DYN}$, controller 402 begins generating pulses of control signal $CS_1$.

For example, the power utilization of load 132 for cycle 502 of the input voltage $V_X$ correlates to a value of the voltage switching threshold $V_{LINE\_MIN\_DYN}$ equal to $V_{LINE\_MIN\_DYN\_502}$. The input voltage $V_X$ initially reaches $V_{LINE\_MIN\_DYN\_502}$ at a 30° phase angle cut of input voltage $V_X$ and reaches $V_{LINE\_MIN\_DYN\_502}$ again at a 150° phase angle cut. In at least one embodiment, for cycle 502, controller 402 begins generating pulses of control signal $CS_1$ when the input voltage $V_X$ initially reaches $V_{LINE\_MIN\_DYN\_502}$ at the 30° phase angle of the input voltage $V_X$. In at least one embodiment, controller 402 stops generating pulses of control signal $CS_1$ when the input voltage $V_X$ reaches a 150° phase angle cut of the input voltage $V_X$. Accordingly, in this embodiment, the switching duty cycle of control signal $CS_1$ is reduced by 1/3 or approximately 33.3%, e.g. for a sine wave [1−(150°−30°)/180°].

Continuing the example, the cycle 504 of the input voltage $V_X$ occurs at a time after cycle 504 when the power utilization of load 132 has increased relative to the power utilization of the load 132 when cycle 502 was generated. The power utilization of load 132 for cycle 504 now correlates to a value of the voltage switching threshold $V_{LINE\_MIN\_DYN}$ equal to $V_{LINE\_MIN\_DYN\_504}$. The value of voltage switching threshold $V_{LINE\_MIN\_DYN\_504}$ is less than the value of voltage switching threshold $V_{LINE\_MIN\_DYN\_502}$ so that portion of the input voltage $V_X$ used to provide power to load 132 during cycle 502 is greater than the portion of the input voltage $V_X$ used to provide power to load 132 during cycle 504. For cycle 504, the input voltage $V_X$ initially reaches $V_{LINE\_MIN\_DYN\_504}$ at a 20° phase angle cut of input voltage $V_X$ and reaches $V_{LINE\_MIN\_DYN\_504}$ again at a 160° phase angle cut. In at least one embodiment, for cycle 504, controller 402 begins generating pulses of control signal $CS_1$ when the input voltage $V_X$ initially reaches $V_{LINE\_MIN\_DYN\_504}$ at the 30° phase angle of the input voltage $V_X$. In at least one embodiment, controller 402 stops generating pulses of control signal $CS_1$ when the input voltage $V_X$ reaches a 160° phase angle cut of the input voltage $V_X$. Accordingly, in this embodiment, the switching duty cycle of control signal $CS_1$ is reduced by 2/9 or approximately 22.2%, i.e. [1−(160°−20°)/180°].

Thus, when the dynamically determined, minimum line voltage switching threshold $V_{LINE\_MIN\_DYN}$ is non-zero, controller 402 enables and disables the generation of pulses of control signal $CS_1$ when the input voltage $V_X$ is below the voltage switching threshold $V_{LINE\_MIN\_DYN}$. Because the input voltage $V_X$ is less at low and high phase angles relative to the peak voltage phase angle of 90°, input voltage $V_X$ provides less power at the low and high phase angles than at phase angles closer to 90°. For example, the input voltage $V_X$ at phase angles 20° and 160° provides less power than when the input voltage $V_X$ is at 30° and 150°. However, switching power losses of switch 410 remain constant while controller 402 generates pulses of control signal $CS_1$ regardless of the phase angle of input voltage $V_X$. Thus, the efficiency of electronic power control system 400 increases when the switching duty cycle of control signal $CS_1$ decreases at low and high phase angles relative to the peak phase angle of 90°.

As the voltage switching threshold $V_{LINE\_MIN\_DYN}$ increases, the frequencies of the input current $i_{IN}$ and the input voltage $V_X$ diverge. Divergent frequencies of the input current $i_{IN}$ and the input voltage $V_X$ cause harmonic distortion. In at least one embodiment, to prevent the total harmonic distortion (THD) from exceeding a predetermined maximum allowable THD, a maximum voltage switching threshold $V_{LINE\_MIN\_DYN\_MAX}$ is set. As subsequently discussed in more detail, the value of the maximum voltage switching threshold $V_{LINE\_MIN\_DYN\_MAX}$ is a function of one or more operating parameters of the electronic power control system 400. Also, as subsequently discussed in more detail, in at least one embodiment, controller 402 dynamically determines the maximum voltage switching threshold $V_{LINE\_MIN\_DYN\_MAX}$ based on power utilization of the load 132.

The number of dynamically determined, minimum line voltage switching thresholds used per cycle of input voltage $V_X$ is a matter of design choice. In FIG. 5, the waveform of each cycle of the used input voltage $V_{X\_USED}$ is symmetric, i.e. the same voltage switching threshold $V_{LINE\_MIN\_DYN}$ is used to determine when to begin generating pulses of control signal $CS_1$ and when to stop generating pulses of control signal $CS_1$. In another embodiment, one voltage switching threshold is used to determine when to begin generating pulses of control signal $CS_1$ and another voltage switching threshold is used to determine when to stop generating pulses of control signal $CS_1$.

Figure 6:
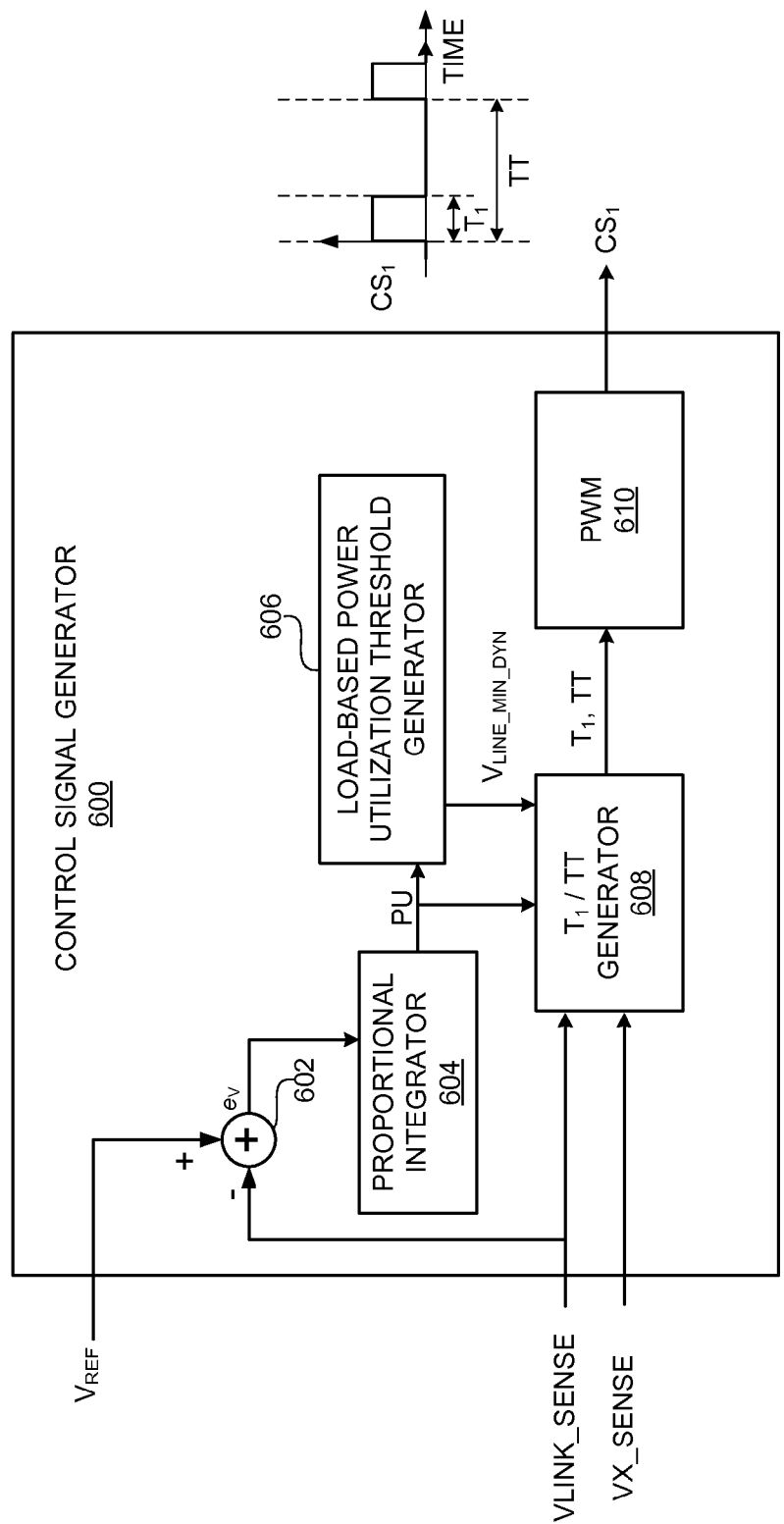
FIG. 6 depicts an exemplary control signal generator for the electronic power control system of FIG. 4.

FIG. 6 depicts a control signal generator 600, which represents one embodiment of the control signal generator 404. In at least one embodiment, the control signal generator 600 includes a microprocessor and a memory having code executable by the processor to implement some or all of the operations of the control signal generator. Control signal generator 600 receives the sense signals $V_{LINK\_SENSE}$ and $V_{X\_SENSE}$, which respectively represent link voltage $V_{LINK}$ and input voltage $V_X$. Subtraction operator 602 subtracts the sense signal $V_{LINK\_SENSE}$ from a reference voltage $V_{REF}$ to generate an error signal $e_V$. The reference signal $V_{REF}$ represents a target link voltage. As the load 132 requires less power, less current is drawn from link capacitor 130 (FIG. 4). As less current is drawn from capacitor 130, the link voltage $V_{LINK}$ will begin to increase. Thus, since the sense signal $V_{LINK\_SENSE}$ is directly proportional to the link voltage $V_{LINK}$, the sense signal $V_{LINK\_SENSE}$ increases above the reference voltage $V_{REF}$ as the power utilization of load 132 decreases. Conversely, when the power utilization of load 132 increases, more current is drawn from capacitor 130, and the link voltage $V_{LINK}$, and correspondingly the sense signal $V_{LINK\_SENSE}$ will decrease. Thus, the error signal $e_V$ provides a direct indication of the power utilization of load 132.

A proportional integrator 604 performs a proportional integration on the error signal $e_V$ and generates a power utilization factor PU representing the power utilization of load 132. The proportional integrator 604 compensates for small changes in the error signal $e_V$ over time to generate a stable power utilization factor PU. In at least one embodiment, the power utilization factor PU is a value ranging from 0 to 1, with 0 corresponding to zero power utilization and 1 corresponding to 100% power utilization by load 132 of power available from switching power converter 408 (FIG. 4). In at least one embodiment, the subtraction operator 602 and proportional integrator 604 dynamically determine the power utilization of the load 132 during each cycle of the input voltage $V_X$.

The load-based power utilization threshold generator 606 generates the voltage switching threshold $V_{LINE\_MIN\_DYN}$ using the power utilization factor PU. In at least one embodiment, the load-based power utilization threshold generator 606 executes the following Verilog code to generate the voltage switching threshold $V_{LINE\_MIN\_DYN}$:

(1) always@(posedge clk)
(2) if (PU<Vrect_thresh_trip)
(3) Vrect_thresh<=vrect_cut*(PU−Vrect_thresh_trip);
(4) else
(5) Vrect_thresh<=0;
(6) $V_{LINE\_MIN\_DYN}$=Vrect_thresh*Vpeak;

Line (1) of the code causes the subsequent lines of code to execute at a frequency "clk". An exemplary value for the frequency clk is 2 times the frequency of the input voltage $V_{IN}$, such as 120 Hz in the United States of America and 100 Hz in Europe.

Line (2) of the code determines if the power utilization factor PU of the load 132 is less than the value of Vrect_thresh_trip. The value of Vrect_thresh_trip is a maximum percentage of the input voltage $V_X$ above which the switching duty cycle of control signal $CS_1$ is set to 100%. The value of Vrect_thresh_trip directly corresponds to the voltage switching threshold $V_{LINE\_MIN\_DYN\_MAX}$. If PU is less than Vrect_thresh_trip, then line (3) is executed. Otherwise, the load-based power utilization threshold generator 606 executes lines (4) and (5).

Line (3) sets the value of Vrect_thresh equal to vrect_cut times (PU−Vrect_thresh_trip). "vrect_cut" represents a rate of change of voltage switching threshold $V_{LINE\_MIN\_DYN}$ as the power utilization factor PU changes. The power utilization factor PU and the voltage switching threshold $V_{LINE\_MIN\_DYN}$ are inversely proportional, so the value of vrect_cut is negative.

Lines (4) and (5) set the value of Vrect_thresh equal to zero if the power utilization factor PU is greater than Vrect_thresh_trip. Setting Vrect_thresh equal to zero indicates that the power utilization of the load 132 is high enough for load-based power utilization threshold generator 606 to set the switching duty cycle of control signal $CS_1$ to 100%.

Line (6) sets the voltage switching threshold $V_{LINE\_MIN\_DYN}$ equal to Vrect_thresh times Vpeak, and Vpeak is the peak voltage of the input voltage $V_X$. Thus, if Vrect_thresh equals 0 because of a high power utilization of load 132, voltage switching threshold $V_{LINE\_MIN\_DYN}$ is set to 0. If voltage switching threshold $V_{LINE\_MIN\_DYN}$ is zero, the control signal $CS_1$ has a 100% switching duty cycle, and switch 410 operates continually until the value of voltage switching threshold $V_{LINE\_MIN\_DYN}$ changes. If Vrect_thresh is non-zero, load-based power utilization threshold generator 606 sets the value of voltage switching threshold $V_{LINE\_MIN\_DYN}$ equal to the percentage of the peak input voltage $V_X$ indicated by Vrect_thresh.

Figure 7:
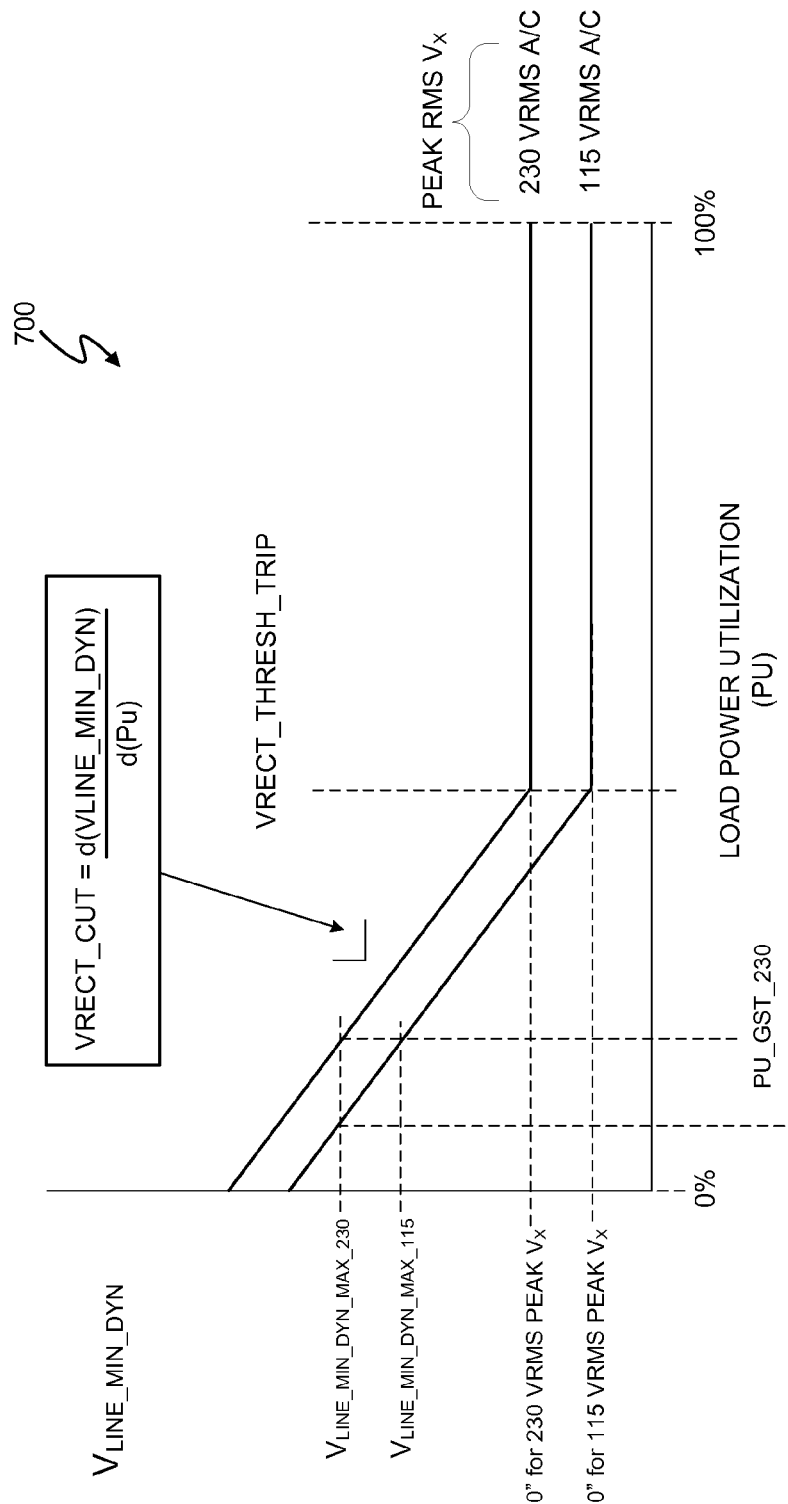
FIG. 7 depicts a voltage threshold related parameter relationships associated with generating the minimum line voltage switching threshold.

FIG. 7 depicts voltage switching threshold $V_{LINE\_MIN\_DYN}$ related parameter relationships 700 as determined by an exemplary embodiment of the code to generate the voltage switching threshold $V_{LINE\_MIN\_DYN}$. The voltage switching threshold $V_{LINE\_MIN\_DYN}$ can be determined for any peak value of input voltage $V_X$. Two typical values of 230 VRMS and 115 VRMS are illustrative of the relationship between the power utilization PU of load 132 and the voltage switching threshold $V_{LINE\_MIN\_DYN}$.

Referring to FIGS. 6 and 7, if the power utilization PU is greater than Vrect_thresh_trip, then load-based power utilization threshold generator 606 generates control signal $CS_1$ with a 100% switching duty cycle. If the power utilization PU is less than Vrect_thresh_trip, then the value of voltage switching threshold $V_{LINE\_MIN\_DYN}$ increases at a rate equal to vrect_cut. In at least one embodiment, the value of voltage switching threshold $V_{LINE\_MIN\_DYN}$ continues to increase until the power utilization equals zero. In another embodiment, the value of voltage switching threshold $V_{LINE\_MIN\_DYN}$ increases until the power utilization factor reaches a minimum power utilization associated with an acceptable loop gain in load-based power utilization threshold generator 606. The minimum power utilization for the input voltage equal to 115VRMS and 230VRMS is respectively PU_GST_115 and PU_GST_230. When voltage switching threshold $V_{LINE\_MIN\_DYN}$ reaches PU_GST_115 for $V_X$=115VRMS or PU_GST_230 for $V_X$=230VRMS, voltage switching threshold $V_{LINE\_MIN\_DYN}$ is set respectively to voltage switching threshold $V_{LINE\_MIN\_DYN\_115}$ or voltage switching threshold $V_{LINE\_MIN\_DYN\_230}$. The power transferred over a quarter-sine wave of input voltage $V_X$ is shown below. Since the input voltage $V_X$ is symmetrical for phase angles 0-90° and 90°-180° (i.e. 0−π/2 and π/2−π), the integral for power P is determined from 0 to pi/2, i.e. 90°, to allow for a less complicated integral:

$$P = \frac{Vrms^2}{R}$$

$$P = \int_T^{\Pi/2} \frac{Vrms^2 * \sin^2(t)}{R} dt$$

$$P = C * \int_T^{\Pi/2} \sin^2(t) dt$$

$$P = \frac{C}{4} * (-2*T + \sin(2-T) + \Pi)$$

T represents the phase angle cut in radians of the input voltage $V_X$, and C represents $V_{rms}^2/R$. T is expressed in terms of Vrect_thresh (with 0 being no cut of the input voltage $V_X$ and 1 being a full sine wave cut of input voltage $V_X$) as follows:

$$T = \text{arcsine}(Vrect_{thresh})$$

Accordingly, the proportion of power cut ($P_{cut}$) by the load-based power utilization threshold generator 606 as a result of cutting the input voltage $V_X$ and the actual total power ($P_{tot}$) available for supply by the switching power converter 408 (FIG. 4) is:

$$\frac{P_{cut}}{P_{tot}} = \frac{\frac{C}{4} * (-2 * \sin^{-1}(Vrect_{thresh}) + \sin(2 * \sin^{-1}(Vrect_{thresh})) + \Pi)}{\frac{C}{4} * \Pi} \quad [1]$$

$$\frac{P_{cut}}{P_{tot}} = \frac{-2}{\Pi} * \sin^{-1}(Vrect_{thresh}) + \frac{1}{\Pi} * \sin(2 * \sin^{-1}(Vrect_{thresh})) + 1$$

TABLE 1

| Vrect_thresh | Phase | sin$^{-1}$(Vrect_thresh) | % Power | Gain (dB) |
|---|---|---|---|---|
| 0 | 0 | 0 | 1 | 0 |
| 0.1 | 5.74 | 0.1 | 1 | 0 |
| 0.2 | 11.54 | 0.2 | 1 | −0.03 |
| 0.3 | 17.46 | 0.3 | 0.99 | −0.1 |
| 0.4 | 23.58 | 0.41 | 0.97 | −0.25 |
| 0.5 | 30 | 0.52 | 0.94 | −0.52 |
| 0.6 | 36.87 | 0.64 | 0.9 | −0.95 |
| 0.7 | 44.43 | 0.78 | 0.82 | −1.67 |
| 0.8 | 53.13 | 0.93 | 0.72 | −2.91 |
| 0.9 | 64.16 | 1.12 | 0.54 | −5.4 |
| 1 | 90 | 1.57 | 0 | −Alot |

Referring to Table 1, Vrect_thresh equals voltage switching threshold $V_{LINE\_MIN\_DYN}/V_{X\_PEAK}$. The Phase refers to the phase cut of the input voltage $V_X$, $\sin^{-1}$ (Vrect_thresh) is the arcsin of Vrect_thresh. "% Power" is the amount of power relative to total power available from input voltage $V_X$ with no phase cutting that is provided by switching power converter 408 to load 132. The Gain is gain introduced into load-based power utilization threshold generator 606 by the phase cutting due to the difference between the expected power to be delivered to the load 132 based on zero phase cutting of the input voltage $V_X$, and the actual power delivered to the load 132 with phase cutting of input voltage $V_X$. For example, for a 115VRMS peak input voltage $V_X$, if Vrect_thresh equals 0.5, voltage switching threshold $V_{LINE\_MIN\_DYN}$ equals 57.5V, the phase angle cut is 30°, the percentage power delivered to the load 132 is 94%, and the gain is −0.52 dB.

Following is a specific example of the effect of a non-zero voltage switching threshold $V_{LINE\_MIN\_DYN}$ for a vrect_thresh_trip corresponding to a 0.4 power utilization factor PU, i.e. voltage switching threshold $V_{LINE\_MIN\_DYN}$ equals 0 for all PU>0.4, thus, no phase cutting of input voltage $V_X$ for all values of the input voltage $V_X$ above the voltage switching threshold $V_{LINE\_MIN\_DYN}$.

if (Pu>0.4)

Vrect_thresh_pct=0.0;

else

Vrect_thresh_pct=(0.4−Pu);

For this example, the derivative of $P_{CUT}/P_{TOT}$ is:

$$\frac{d}{dx} * \left( \frac{-2}{\Pi} * \sin^{-1}(0.4 - x) + \frac{1}{\Pi} * \sin(2 * \sin^{-1}(0.4 - x)) + 1 \right) = \quad [2]$$

$$\frac{2 - 2 * \cos(2 * \sin^{-1}(0.4 - x))}{\Pi * \sqrt{1 - (0.4 - x)^2}}$$

Table 2 represents the evaluation of equation [2] over the valid range of the power utilization factor PU less than or equal to 0.4:

TABLE 2

| PU | Vrect_thresh | Top Term of Equation (4) | Bottom Term | Derivative | Loop gain impact (dB) |
|---|---|---|---|---|---|
| .05 | 0.35 | 0.49 | 2.94 | 0.17 | −1.58 |
| .10 | 0.30 | 0.36 | 3.00 | 0.12 | −1.11 |
| .15 | 0.25 | 0.25 | 3.04 | 0.08 | −0.74 |
| .20 | 0.20 | 0.16 | 3.08 | 0.05 | −0.46 |
| .25 | 0.15 | 0.09 | 3.11 | 0.03 | −0.26 |
| .30 | 0.10 | 0.04 | 3.13 | 0.01 | −0.11 |
| .35 | 0.05 | 0.01 | 3.14 | 0 | −0.03 |
| .40 | 0.00 | 0.00 | 3.14 | 0 | 0 |

Thus, as the power utilization factor decreases and the voltage switching threshold $V_{LINE\_MIN\_DYN}$ increases, the negative effect on the loop gain of the load-based power utilization threshold generator 606 becomes apparent. Accordingly, in at least one embodiment, to maintain a stable load-based power utilization threshold generator 606, the maximum voltage switching threshold $V_{LINE\_MIN\_DYN}$ is set so that the corresponding loop gain does not cause the load-based power utilization threshold generator 606 to become unstable. The particular value of the maximum voltage switching threshold $V_{LINE\_MIN\_DYN}$ depends upon characteristics of electronic power control system 400. In at least one embodiment, vrect_thresh_trip is set at PU equal to 0.4.

Thus, in at least one embodiment, when selecting values for vrect_thresh_trip and vrect_cut three trade-off criteria are considered:

Efficiency improvements by increasing the maximum allowable voltage switching threshold $V_{LINE\_MIN\_DYN}$;

Minimizing control loop stability impact due to, for example, increasing negative loop gain;

Maintain acceptable THD+noise.

In at least one embodiment, to achieve efficiency while having at most a 1.11 dB impact on the control loop and no change in THD+noise below 20% of full power $P_{TOT}$, set vrect_thresh_trip at 0.2 and select vrect_cut such that at Pu=0, vrect_thresh is 0.3. This would give a vrect_cut of 1.5.

Referring to FIG. 6, control signal generator 600 includes a $T_1$/TT generator 608 to determine $T_1$ and TT of the control signal $CS_1$. "$T_1$" is the pulse width of control signal $CS_1$, and "TT" is the period of control signal $CS_1$. The voltage switching threshold $V_{LINE\_MIN\_DYN}$ is utilized as previously described to disable generation of control signal $CS_1$ by, for example, setting the pulse width $T_1$ of control signal $CS_1$ equal to zero. The $T_1$/TT generator 608 provides the determined values of $T_1$ and TT to pulse width modulator (PWM) 610. PWM 610 generates the control signal $CS_1$ in accordance with the values of $T_1$ and TT received from the $T_1$/TT generator 608.

The particular implementation of the $T_1$/TT generator 608 and the proportional integrator 604 are matters of design choice. In at least one embodiment, the $T_1$/TT generator 608 and proportional integrator are implemented as described in U.S. Pat. No. 7,719,246, entitled "Power Control System Using a Nonlinear Delta-Sigma Modulator with Nonlinear Power Conversion Process Modeling", filed Dec. 31, 2007, inventor John L. Melanson, and assignee Cirrus Logic, Inc., which is hereby incorporated by reference in its entirety.

Figure 8:
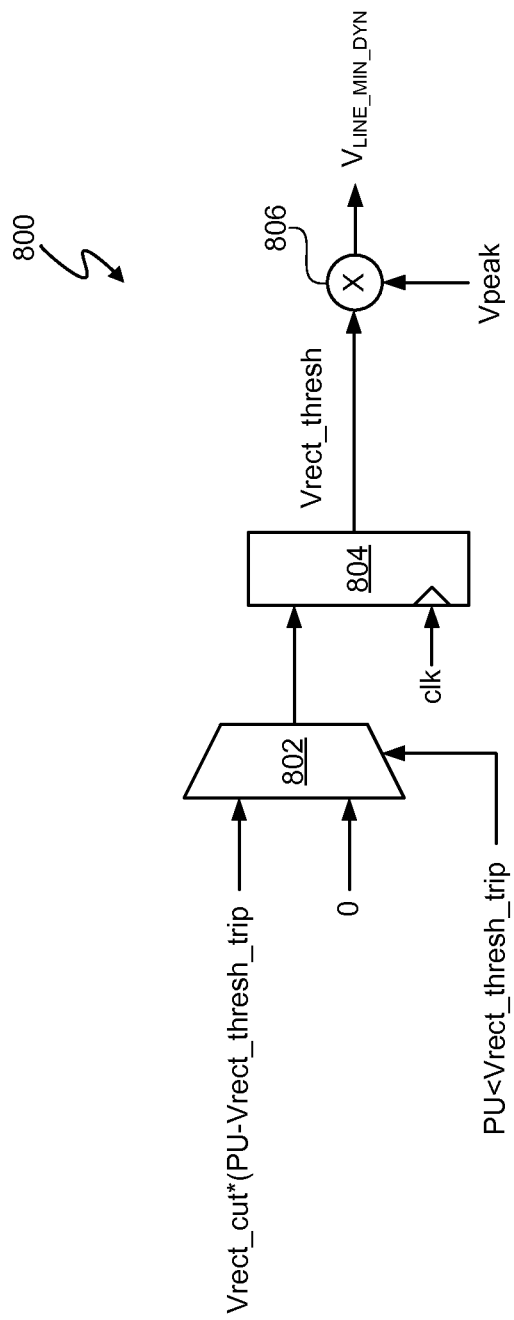
FIG. 8 depicts an exemplary load-based power utilization threshold generator of the control signal generator of FIG. 6.

FIG. 8 depicts an exemplary load-based power utilization threshold generator 800, which represents an embodiment of the load-based power utilization threshold generator 606. The values of "Vrect_cut", "PU", "Vrect_thresh_trip", "Vrect_thresh", "Vpeak", "$V_{LINE\_MIN\_DYN}$", and "clk" are the same as described in conjunction with the load-based power utilization threshold generator 606 and the Verilog code used to generate the voltage switching threshold $V_{LINE\_MIN\_DYN}$. The load-based power utilization threshold generator 800 includes a 2:1 multiplexer 802. If PU is less than Vrect_thresh_trip, then multiplexer 802 selects vrect_cut*(PU−Vrect_thresh_trip) as the output of multiplexer 802. Otherwise, the output of multiplexer 802 is 0. D-flip-flop 804 provides the output Vrect_thresh of multiplexer 802 as to an input of multiplier 806 upon occurrence of each positive edge of the clock signal clk. Multiplier 806 multiplies Vrect_thresh times Vpeak to generate voltage switching threshold $V_{LINE\_MIN\_DYN}$. Thus, if Vrect_thresh is non-zero, load-based power utilization threshold generator 800 sets the value of voltage switching threshold $V_{LINE\_MIN\_DYN}$ equal to the percentage of the peak input voltage $V_X$ indicated by Vrect_thresh.

Thus, by correlating phase cutting of the input voltage to power utilization by a load, in at least one embodiment, an electronic system reduces switching losses associated with switching of a control switch in the switching power converter while still meeting power demands by a load.

Although embodiments have been described in detail, it should be understood that various changes, substitutions, and alterations can be made hereto without departing from the spirit and scope of the invention as defined by the appended claims.

What is claimed is:

1. A method comprising:
    determining power utilization of a load coupled to a switching power converter, wherein determining power utilization of the load comprises:
        sensing a link voltage of the switching power converter;
        comparing the link voltage to a reference voltage to generate a comparison value between the link voltage and the reference voltage; and
        determining the power utilization of the load based on the comparison value;
    generating a switch control signal to control the switching power converter when an input voltage to the switching power converter is greater than a threshold value, wherein the threshold value is based on power utilization of the load; and
    disabling generation of the switch control signal when the input voltage to the switching power converter is less than the threshold value.

2. An apparatus comprising:
    a controller configured to:
        determine power utilization of a load coupled to a switching power converter, wherein to determine power utilization of the load comprises:
            to sense a link voltage of the switching power converter;
            to compare the link voltage to a reference voltage to generate a comparison value between link voltage and the reference voltage; and
            to determine the power utilization of the load based on the comparison value;
        generate a switch control signal to control the switching power converter when an input voltage to the switching power converter is greater than a threshold value, wherein the threshold value is based on power utilization of the load; and
        disable generation of the switch control signal when the input voltage to the switching power converter is less than the threshold value.

* * * * *